(12) United States Patent
Porst et al.

(10) Patent No.: US 11,027,531 B2
(45) Date of Patent: Jun. 8, 2021

(54) MULTILAYERED, FLEXIBLE, FLAT SEMI-FINISHED PRODUCT OR COMPONENT WITH A SEGMENT-LIKE SURFACE AND A METHOD FOR ITS MANUFACTURE, AS WELL AS A MULTIDIMENSIONALLY CURVED MOULDED PART MADE THEREFROM AND A METHOD FOR ITS MANUFACTURE

(71) Applicant: C. H. MÜLLER GMBH, Heinsdorfergrund (DE)

(72) Inventors: Philipp Porst, Heinsdorfergrund (DE); Roman Rinberg, Chemnitz (DE); Lothar Kroll, Dresden (DE); Sebastian Iwan, Chemnitz (DE); Wolfgang Nendel, Dederan (DE)

(73) Assignee: C. H. Müller GmbH, Heinsdorfergrund (DE)

( * ) Notice: Subject to any disclaimer, the term of this patent is extended or adjusted under 35 U.S.C. 154(b) by 44 days.

(21) Appl. No.: 16/443,962

(22) Filed: Jun. 18, 2019

(65) Prior Publication Data
US 2019/0381770 A1 Dec. 19, 2019

(30) Foreign Application Priority Data
Jun. 19, 2018 (DE) .......................... 102018114687.6

(51) Int. Cl.
*B32B 27/08* (2006.01)
*B32B 7/12* (2006.01)
(Continued)

(52) U.S. Cl.
CPC ............... *B32B 27/08* (2013.01); *B32B 7/12* (2013.01); *B29C 43/003* (2013.01);
(Continued)

(58) Field of Classification Search
CPC ......... B29C 65/00; B29C 65/02; B29C 65/18; B29C 65/72; B29C 63/00; B29C 63/0004; B29C 63/0017; B29C 63/0073; B29C 63/02; B29C 43/00; B29C 43/003; B29C 43/20; B29C 43/203; B29C 43/02; B29C 43/22; B29C 43/30; B29C 43/305; B32B 2605/003; B32B 5/22; B32B 5/24; B32B 5/28; B32B 27/04; B32B 2317/16; B32B 27/08; B32B 2605/00; B32B 2260/02;
(Continued)

(56) References Cited

U.S. PATENT DOCUMENTS 2,821,764 A * 2/1958 Leahy ................. B29C 45/1418
24/713.6
4,140,825 A * 2/1979 Koschorrek .............. E04D 3/35
156/435

FOREIGN PATENT DOCUMENTS

DE 3239732 C2 9/1988
DE 271669 A1 9/1989
(Continued)

*Primary Examiner* — Philip C Tucker
*Assistant Examiner* — Brian R Slawski
(74) *Attorney, Agent, or Firm* — Heslin Rothenberg Farley & Mesiti P.C.

(57) ABSTRACT

The invention relates to a multilayered, flexible, flat semi-finished product or component with a segment-like surface and a method for its manufacture, as well as a multidimensionally curved moulded part made therefrom and a method for the manufacture of such a component.

27 Claims, 5 Drawing Sheets

(51) Int. Cl.
*B29L 9/00* (2006.01)
*B29L 31/30* (2006.01)
*B32B 27/04* (2006.01)
*B29C 65/72* (2006.01)
*B29C 65/02* (2006.01)
*B29C 43/00* (2006.01)
*B29C 43/30* (2006.01)
*B32B 5/28* (2006.01)

(52) U.S. Cl.
CPC ............ *B29C 43/305* (2013.01); *B29C 65/02* (2013.01); *B29C 65/72* (2013.01); *B29L 2009/005* (2013.01); *B29L 2031/30* (2013.01); *B32B 5/28* (2013.01); *B32B 27/04* (2013.01); *B32B 2260/02* (2013.01); *B32B 2317/16* (2013.01); *B32B 2605/00* (2013.01)

(58) Field of Classification Search
CPC ... B32B 1/00; B29L 2009/005; B29L 2031/30
USPC .... 156/60, 61, 63, 71, 72, 91, 92, 250, 252, 156/256, 264, 265, 278, 280, 293, 297, 156/298, 308.2, 309.6; 264/122, 241, 264/257, 259; 428/67, 221, 304.4, 309.9, 428/317.1, 318.4, 323, 326, 327, 328
See application file for complete search history.

(56) References Cited

FOREIGN PATENT DOCUMENTS

| | | | |
|---|---|---|---|
| DE | 4201201 | A1 | 7/1993 |
| DE | 29908123 | U1 | 2/2000 |
| DE | 10344598 | B3 | 3/2005 |
| DE | 60033424 | T2 | 11/2007 |
| DE | 102013202095 | A1 | 8/2014 |
| EP | 2969428 | B1 | 12/2016 |
| EP | 3115162 | A1 | 1/2017 |
| WO | 2013020617 | A1 | 2/2013 |

* cited by examiner

MULTILAYERED, FLEXIBLE, FLAT SEMI-FINISHED PRODUCT OR COMPONENT WITH A SEGMENT-LIKE SURFACE AND A METHOD FOR ITS MANUFACTURE, AS WELL AS A MULTIDIMENSIONALLY CURVED MOULDED PART MADE THEREFROM AND A METHOD FOR ITS MANUFACTURE

CROSS REFERENCE TO RELATED APPLICATION

This application is a U.S. non-provisional application which claims priority to German Application No. 10 2018 114 687.6, filed on Jun. 19, 2018, the entire contents of which are hereby incorporated herein by reference.

The invention relates to a flexible semi-finished product in which plate-shaped segments of locally varying width are joined on a fibre-reinforced composite carrier in such a way that one segment strip overlaps an adjacent segment strip and is overlapped by the other adjacent strip, and to a moulded part made from it. A characteristic pattern of the surface of the semi-finished product or moulded part is created by stacking the strips or flat segments in a bidirectionally displaced way with a variable outer contour. This invention also relates to a method by which the flexible semi-finished product or moulded part can be manufactured, as well as to the final moulded part itself and its manufacturing method.

Wood veneers or plate-shaped fibre-plastic composites, for example in visible carbon quality, offer high optical and haptic properties as surface coatings for composite materials and can be used, for example, in interior and exterior applications in automotive construction, aircraft construction, shipbuilding and rail vehicle construction, as well as for the design of furniture, sports equipment, toys and packaging, since they do not impede the lightweight character of a modern composite material. Rather, such a surface coating promotes the acceptance of such materials and therefore leads to a wider distribution of this material. For the purposes of this application, visible carbon means a plate-shaped fibre-plastic composite, the visible side of which has a layer of transparent matrix material and therefore the reinforcing fibres are visible, which are normally arranged as a fabric.

This contrasts with the poor drapability of such plate-shaped materials. For the purposes of this application, drapability means the formability of a flat structure without tearing or creasing. Due to the poor draping properties of wood veneer, the design freedom offered by composite materials is greatly limited by the coating with wood veneers, since the critical bending angles of textile flat structures on which composite materials are based are much smaller than the critical bending angles of wood veneers.

Various prior art approaches are known that can contribute to solving the problem described.

In the document DD 271 669 A1, a three-dimensionally mouldable surface member is disclosed which has a scale-like superimposed segment structure made of a wood-based material. Described and claimed are segments in square, rectangular or parallelogram design, which superimpose like scales respectively on another segment in a surface area between 5% and 50% of the segment base area and are also superimposed by a next segment. There is a dot-shaped or complete, reversibly detachable or mechanically indestructible cross-link between the contacting segments. A backside coating of the segments with an adhesive film is also described. The segments are preferably produced from a wood veneer sheet laminated onto a thermoplastic shrink foil. An embodiment of the segments as squares with a side length of 8 mm is described as particularly advantageous. The disadvantage is that the wood veneer segments described here must be laminated with a polyethylene foil and that the scale-like arrangement of the segments is only achieved by shrinking this polyethylene foil through the effect of heat. Therefore, the selection of the material of the carrier layer is not arbitrary.

A wood-based material consisting of scale-like superimposed, platelet-shaped members is also known from the DE 42 01 201 A1. Due to the method, the platelets are not aligned in a superimposed fibre orientation. Therefore, the disadvantage here is that the anisotropic material properties of the fibre material wood are not fully exploited.

DE 32 39 732 C2 discloses a deformable fibre mat formed from both fibres of a thermoplastic resin and cellulose fibres. Cellulose is obtained from ground wood pulp and the removal of the lignin content produces a pulp that mainly contains cellulose. This is accompanied by a minimization of mechanical properties such as strength and rigidity. In connection with the confused arrangement of these fibres in the mat described above, this material combination is not suitable for obtaining high strength with low weight and an attractive appearance.

WO 2013/020617 A1 discloses a three-layer interior part of a motor vehicle, wherein the carrier is preferably made of wood and the decorative layer of synthetic random fibres. The decorative layer is only responsible for the function of a visually and haptically high-quality embodiment, but not for carrying the composite and therefore function-integrating object.

DE 103 44 598 B3 discloses a shaped wood plate with at least one layer of long, slender wood shavings, which has both a duroplastic and a thermoplastic adhesive. However, this is based on a completely different object. The object is to obtain a mouldable panel that has improved moisture resistance, transverse tensile strength and heat resistance after moulding.

The document DE 299 08 123 U1 discloses a wood veneer plate, the layers of which are each a wood veneer and which are joined together by means of a thermoplastic or duroplastic adhesive. The lightweight concept is taken into account here by varying the fibre preference direction of the individual layers so that the resulting component can be designed to withstand the load. The disadvantage is that the individual layers have a low draping capacity. In the composite, it can be assumed that the drapability will continue to deteriorate.

From the document DE 10 2013 202 095 A1 a method for the manufacture of decorative material for motor vehicle interiors is known, in which a plurality of pieces of material (in particular leather) are joined together into a block, the block is partially deformed and parts of the block are separated again along various possible cutting planes. The drapability is adjusted by the size of the individual blocks and their distance from each other. The disadvantage of this decorative material and the method is that a component is created which has interrupted individual layers and therefore only low strength and rigidity of the component can be achieved.

The document EP 2 969 428 B1 discloses a moulding material in the form of a cellulose-filled wood-based plate with a printable edge strip and a method for traceability of manufacture in a factory equipped for this purpose. The wood-based plates produced using this method do not have a high lightweight construction potential, as the proportion of adhesive in the material is higher.

The document EP 3 115 162 A1 comprises a plastic moulded body with a base of fibre-reinforced plastic bonded to a layer of wood veneer and a method for its manufacture. The wood veneer layer is connected flat to the base body and therefore impedes the plasticity of the material in such a way that only single curved components can be imaged.

The object of the present invention is therefore to overcome the listed disadvantages of the prior art and to specify a multidimensionally formable semi-finished product, a multidimensionally curved moulded part based thereon, and the methods of manufacture of the semi-finished product or component. The moulded part is characterized in that it has an optically and haptically high quality, which is given by the use of a coating of wood veneer or a plate-shaped material of fibre-plastic composite. Furthermore, the material properties of the wood veneer or the plate-shaped material made of fibre-plastic composite are exploited to specifically adjust the strength and rigidity of the resulting component. The method claimed for the manufacture of the semi-finished product leads to a semi-finished product with a high draping capacity of the semi-finished product, whereby design possibilities are available which clearly exceed the prior art.

The object is achieved by the flexible semi-finished product or component disclosed in claim 1, the method of its manufacture according to claim 12, the multidimensionally curved moulded part according to claim 18 and the method of its manufacture according to claim 22. Further embodiments of the invention are indicated in the respective dependent claims.

According to the invention, the flexible semi-finished product or moulded part consists of an upper and a lower cover layer which rest on the carrier layer. The carrier layer is a flat structure and has a higher drapability than the material of the cover layers. This carrier layer is preferably available as rolled goods and can be removed from the roll by means known per se. For the purpose of this application, the first direction is the direction transverse to the direction of pull of the carrier layer and the second direction is the direction along the direction of pull of the carrier layer.

According to the invention, the upper cover layer consists of a multitude of upper segment parts which are connected by a web to a lower segment part penetrating the carrier layer and therefore form a platelet-shaped segment. These platelet-shaped segments have undercuts in the area of the transition between the upper and lower segment parts.

The carrier layer has a multitude of slot-like apertures which correspond to the contour of the undercuts. The resulting flexible semi-finished product or moulded part is formed by the platelet-shaped segment penetrating the carrier layer in the area of the apertures. The platelet-shaped segments are therefore connected with positive locking to the carrier layer and form the upper and lower cover layers by resting on the upper and lower sides of the carrier layer. Advantageously, a semi-finished product is created which has a high drapability despite the comparatively rigid platelet-shaped segments.

In a preferred embodiment, the carrier layer consists of a flat fibre composite material and, in a particularly preferred embodiment, of a thermoplastic plastic foil that is penetrated by the platelet-shaped segments. The platelet-shaped segments consist of a material which has a lower drapability than the carrier layer and is preferably wood, metal, plastic or a fibre composite material and is present plate-shaped. The fibre composite material is based on a textile flat structure coated with thermosetting or thermoplastic plastics. In a preferred embodiment, the textile flat structures consist of natural fibres and/or glass, carbon, basalt and/or thermoplastic plastic filaments. The filaments can also be present as fibres of finite length. Due to the multitude of possible variations of the materials referring to the carrier layer and the platelet-shaped segments, it is possible for the person skilled in the art to select the right material combination for his application on the basis of his knowledge in this field.

In a top view of the flexible semi-finished product or moulded part, the upper cover layer is formed in a scale-like manner, wherein the contour of the platelet-shaped segments in an embodiment corresponds to a circular sector or in a preferred embodiment to a portion of a polygon. Furthermore, in a particularly preferred embodiment, a plurality of platelet-shaped segments next to each other is integrally connected by connection areas made of the same material as the segments. These strip-shaped segments are arranged side by side and one behind the other on the carrier layer in such a way that, when they are laid flat, they overlap each other and therefore form the cover layers which comprise the upper and lower side of the carrier layer. This strip-shaped design of the segments and the above arrangement is particularly advantageous as it supports the drapability of the rigid material.

The strip-shaped segments, which form the upper and lower cover layers, are preferably coated with an adhesive, which, however, is not cured or cross-linked in the semi-finished product, so that the webs are still only positively joined to the carrier layer. The adhesive is used when a subsequent consolidation of the different materials alone does not allow an integral connection and therefore this adhesive layer contributes to the cohesion of the overall composite.

In a further preferred embodiment, the semi-finished product is coated with another material, which is a flat structure and consists of natural fibres or glass, carbon, basalt or thermoplastic plastic filaments or fibres or mixtures thereof. It is used when the strength requirements of the overall composite or the thickness of the moulded part require it.

According to the invention, the method of manufacturing the semi-finished product or the flexible moulded part includes at least the method steps: Providing the flat structure for the carrier layer, preferably as a take-off from a roller, providing the plate-shaped material for the upper and lower cover layer, producing the apertures in the carrier layer, manufacturing of at least one platelet-shaped segment, preferably by separating from a plate-shaped material, positive joining of at least one platelet-shaped segment with the carrier layer, as well as arranging the upper and lower segment parts flat on top of one another and on the carrier layer.

Both the apertures in the carrier layer and the platelet-shaped segments are produced from the plate material by means of a separating method with a geometrically defined cutting edge or a blasting method. Cutting by blasting has considerable speed advantages over cutting with a geometrically defined cutting edge, since it has no mechanical effect on the material.

If the materials of the carrier layer and the cover layers are selected in such a way that no integral connection is possible with these materials, adhesives are used with which the cover layers can be integrally connected by thermal activation of the adhesive.

The method according to the invention is designed in such a way that, in a further method step, a third material which is suitable for positively influencing the moulded part properties is provided, which is present as a flat structure and, in analogy to the carrier layer, is removed from a roller and integrally connected to the lower cover layer.

The multidimensionally curved moulded part is based on the semi-finished product disclosed in this application. The thermoplastic part of the carrier layer or of the adhesive with which the cover layers are coated, wherein said part is adjusted to flowability by melting, completely wets the upper and lower cover layers and connects them with the carrier layer in an integral and positive manner. For the purpose of surface sealing, the cover layer can be coated with a transparent protective layer, for example a one- or two-component lacquer system or a transparent foil, in a preferred embodiment. In order to improve the mechanical properties of the moulded part, it is coated in a particularly preferred embodiment with an additional layer, preferably a layer that is a flat structure and consists of natural fibres or glass, carbon, basalt or thermoplastic filaments or fibres. This additional layer is connected to the lower cover layer in an integral and positive manner.

According to the invention, the method to manufacture the multidimensional moulded part comprises the steps of providing the semi-finished product, cutting the semi-finished product to size, heating the semi-finished product to the melting temperature of the used thermoplastic material of the carrier layer or of the meltable adhesive and subsequent moulding and cooling below the solidification temperature of the thermoplastic material or of the meltable adhesive in the moulding tool. During the heating process, the temperature is selected so that the thermoplastic material is melted, but the material of the cover layer is not damaged by the effects of the heat. The temperatures required for this are taken from the data sheets and safety data sheets of the respective materials by the person skilled in the art.

According to the invention, the semi-finished product is exposed to temperature on one or both sides, for example by heating devices known per se, which transfer the necessary heat into the semi-finished product by means of contact, convection or radiation. The semi-finished product, which has been cut to size and heated to melting temperature, is transferred to the tool using well-known handling tools such as multi-axis gantries or robot-based handling devices. Advantageously, this method is designed in such a way that it has a high degree of automation and can therefore be used to produce complex shaped near-net-shape moulded parts with a low proportion of waste or no waste in the resulting component. During the solidification process, which requires a holding time that determines the cycle time, pressure is applied to the semi-finished product in the moulding tool. This compresses the material, resulting in an improved integral and positive connection between the carrier layer and the cover layers. In a preferred embodiment, the moulding tool is designed in such a way that the semi-finished product is compacted differently locally and therefore different material properties can be adjusted locally.

The invention is not limited to the represented and described embodiments, but also comprises all embodiments which have the same effect for the purpose of the invention. Furthermore, the invention is not limited to the specifically described feature combinations either, but may also be defined by any other combination of specific features of all the individual features disclosed as a whole, provided that the individual features are not mutually exclusive or a specific combination of individual features is not explicitly excluded.

In the following, exemplary embodiments of the invention will be explained based on figures, without being limited to said embodiments.

In which:

FIG. 1 shows a portion of the semi-finished product (1) according to the invention in a side view (top) and a plan view (bottom). It is shown that the platelet-shaped segments (9) are arranged one after the other in a second direction, penetrate the carrier layer (2) and are deposited on top of one another or on the carrier layer (2). They form the upper (4) and lower (5) cover layer. In plan view, it is shown that the platelet-shaped segments (9) are arranged in such a way that the platelet-shaped segments (9) are arranged offset from one another in order to enable displacement of the platelet-shaped segments (9).

Figure 1:
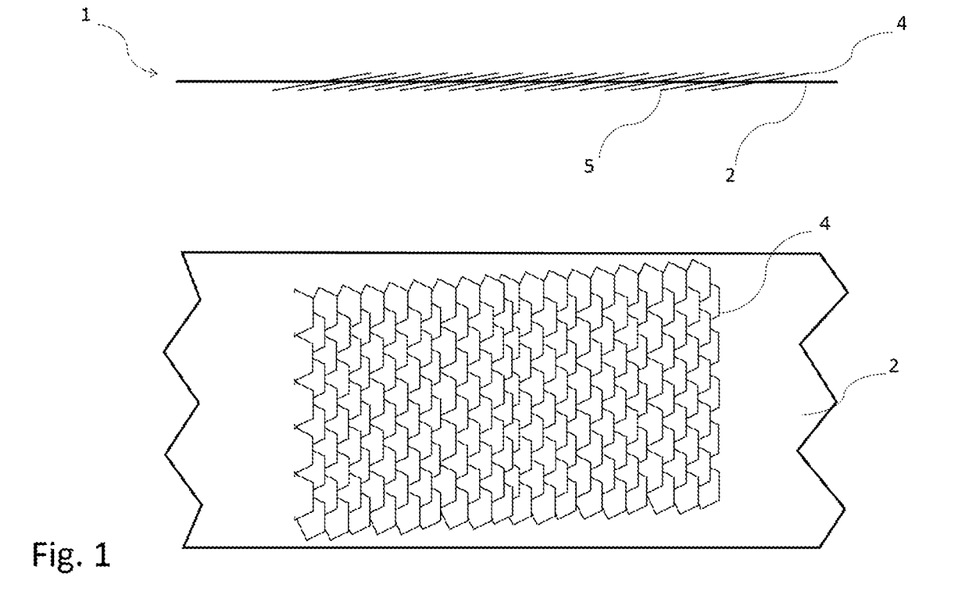
FIG. 1 shows a side view (top) and a plan view of a portion of the semi-finished product.
Figure 2:
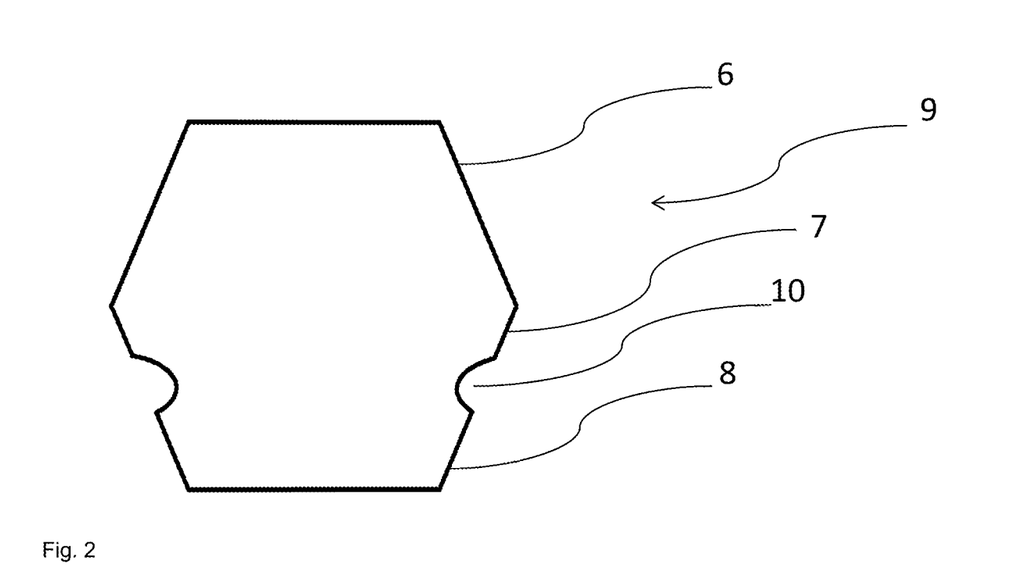
FIG. 2 shows a platelet-shaped segment.

FIG. 2 shows a platelet-shaped segment (9). It is also shown that this platelet-shaped segment (9) consists of an upper segment part (6) and a lower segment part (8) which are connected to one another by a web (7). This web (7) has undercuts (10). The materials of the upper and lower segment parts (6, 8) and the web (7) are identical.

Figure 3:
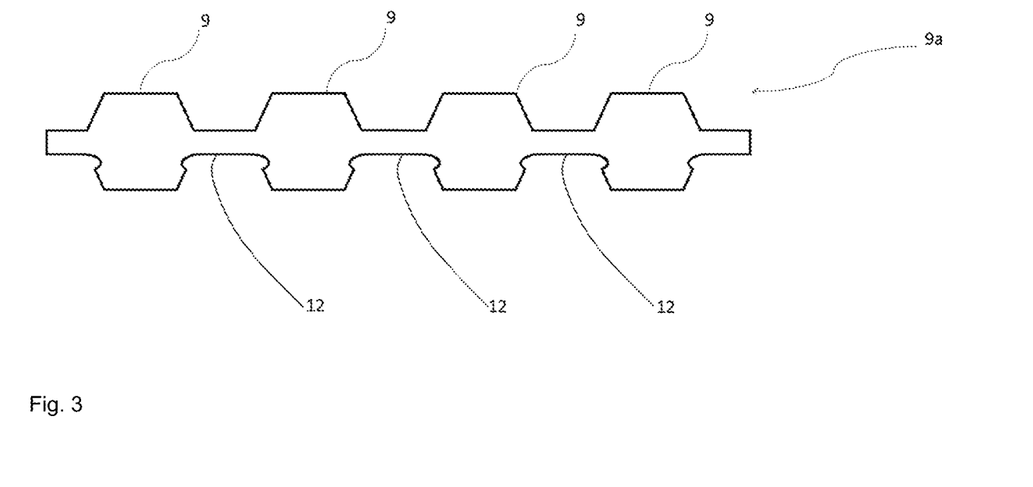
FIG. 3 shows a plurality of platelet-shaped segments which are connected to each other in a strip-shaped manner in a first direction.

FIG. 3 shows that strip-shaped segments (9a) are formed by the strip-shaped arrangement of a multitude of platelet-shaped segments (9) which are connected to one another by a connection area (12). The materials of the platelet-shaped segments (9) and the connection areas (12) are identical.

Figure 4:
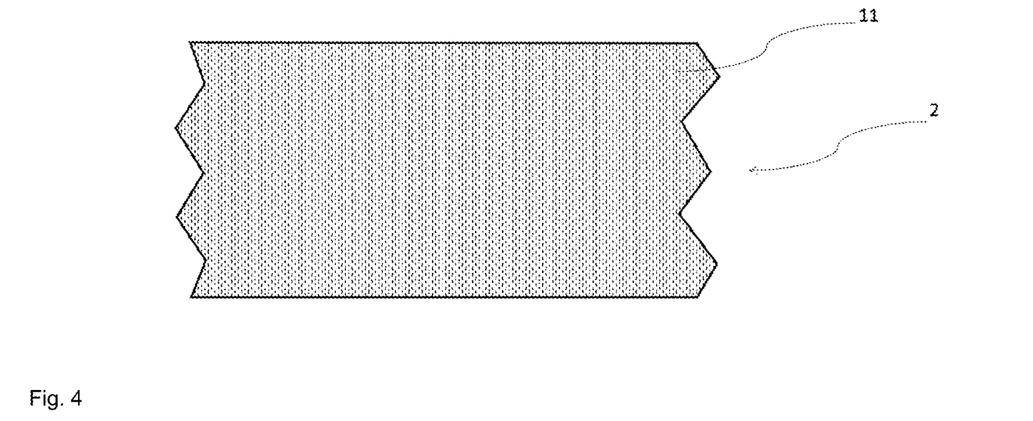
FIG. 4 shows in a plan view a portion of the carrier layer with apertures

FIG. 4 shows, in plan view, a portion of the carrier layer (2) which preferably consists of a flat structure and this flat structure is a thermoplastic foil or a flexible composite material which consists of a proportion of natural fibres or glass, carbon, basalt or thermoplastic plastic filaments or fibres and a proportion of thermoplastic plastic fibres which have a lower melting point than the aforementioned materials.

Figure 5:
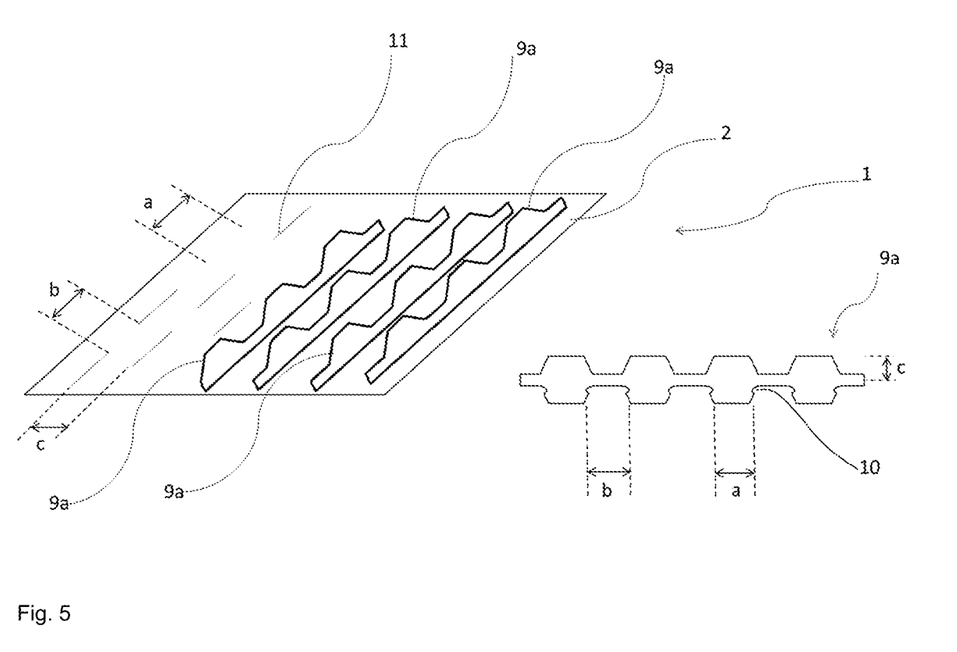
FIG. 5 shows a portion of the semi-finished product in a cavalier perspective

FIG. 5 shows in a cavalier perspective a portion of the semi-finished product in a method step in which the strip-shaped segments (9a) are joined to the carrier layer (2). Furthermore, a detailed representation shows a front view of a strip-shaped segment (9a). It is shown that the strip-shaped segments (9a) penetrate the carrier layer (2) to such an extent that they rest on the carrier layer. The distance in the second direction, i.e. in the longitudinal direction of the carrier layer, depends on the degree of drapability and the degree of overlap (c) of the individual segment strips and is subject to the general knowledge of the person skilled in the art and must, if necessary, be verified by usual experimental investigations of draping behaviour. It is also shown that the width (a) of the apertures (11) corresponds to the width of the undercuts (10) of a segment (9) (not shown here individually) and the spacing (b) of the apertures (11) corresponds to the spacing of the undercuts (10) of two adjacent segments (9) (not shown here individually) of a strip-shaped segment (9a).

Figure 6:
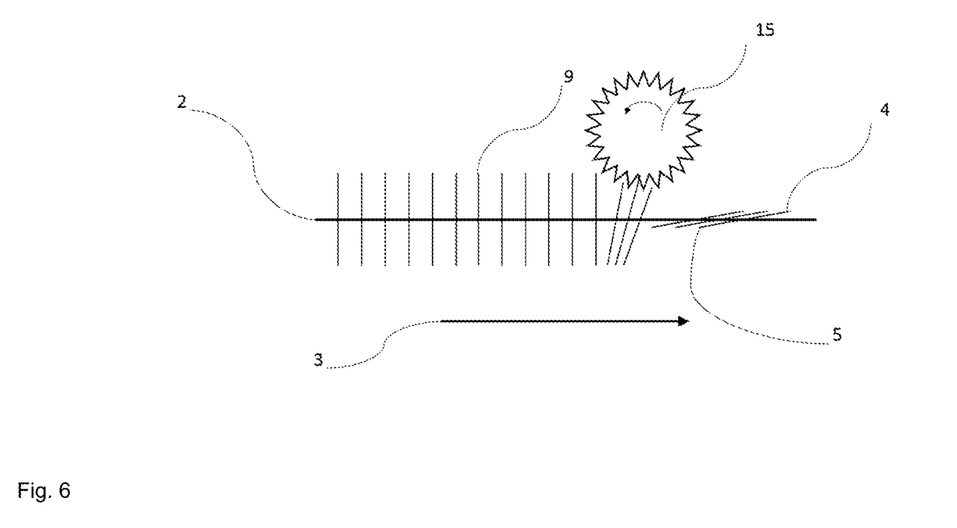
FIG. 6 shows in a side view a portion of the semi-finished product in a method step during the arrangement of the segments on top of each other.

FIG. 6 shows in a side view a portion of the carrier layer (2) penetrated by a multitude of segments (9) in a method step immediately after joining the platelet-shaped segments (9). Furthermore, it is shown that the segments are forced by a brush roller or an equally acting contacting tool, without damage, in a preferred direction, related to the feed direction (3) of the carrier layer (2).

Figure 7:
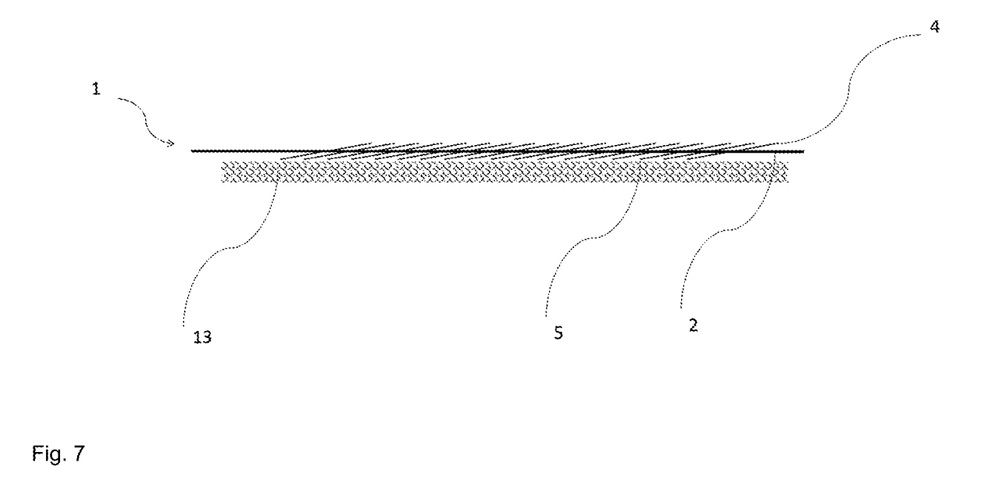
FIG. 7 shows a side view of a portion of the semi-finished product coated with an additional material

FIG. 7 shows, in a side view, a portion of a semi-finished product (1) in a preferred embodiment, consisting of the upper and lower cover layer (4, 5), the carrier layer (2) and an additional layer which is characterized by a flat structure (13) and is connected to the lower cover layer (5).

Figure 8:
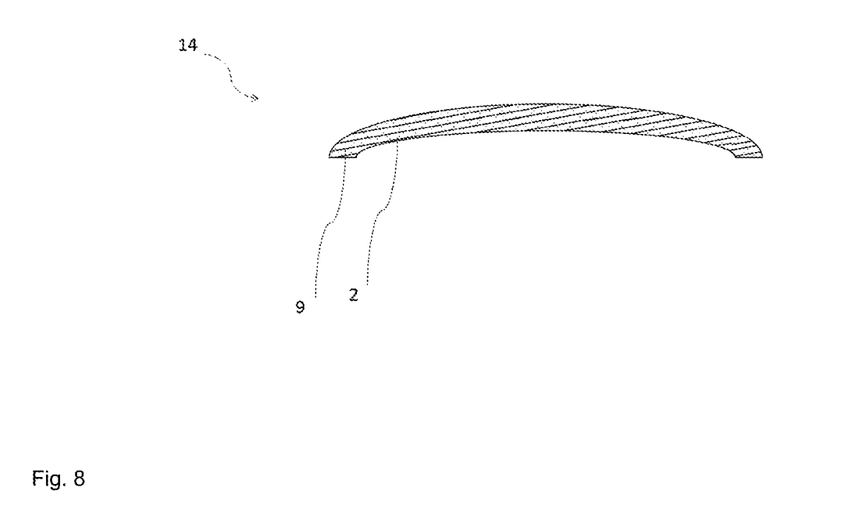
FIG. 8 shows a sectional view of a multidimensionally curved moulded part

FIG. 8 shows a sectional view of a multidimensional moulded part (14) consolidated by a pressing method. It can be seen that the carrier layer is no longer present as a flat structure, but is wetted by melting, flowing and solidifying the platelet-shaped segments (9) and as a result of which the moulded part is formed in its geometric dimensions.

Figure 9:
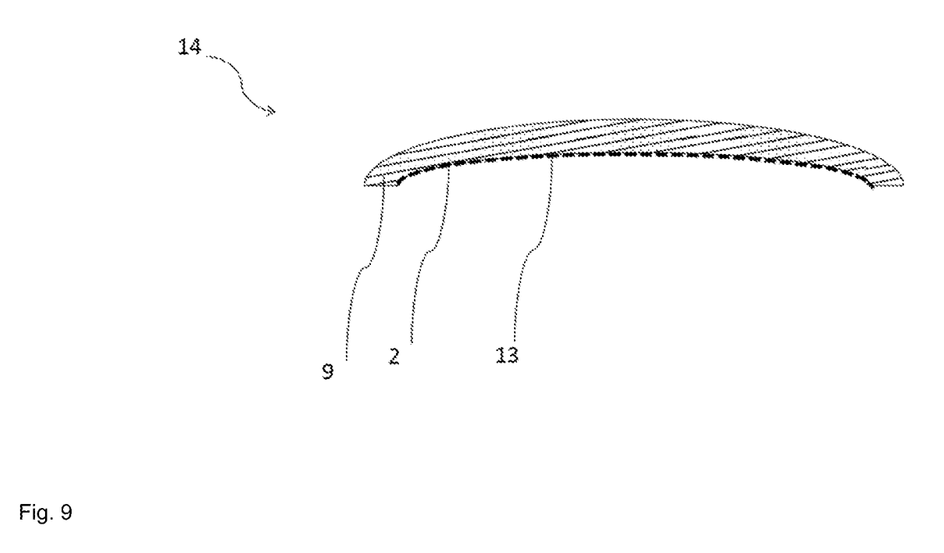
FIG. 9 shows a sectional view of the multidimensionally curved moulded part from FIG. 8, coated with an additional material

FIG. 9 shows a sectional view of a multidimensional moulded part (14) consolidated by a pressing method. In analogy to the illustration in FIG. 8, the carrier layer is no longer present as a flat structure. In order to influence the properties and thickness of the moulded part, it is additionally coated with another layer in the form of a flat structure (13).

REFERENCE NUMERALS

- 1 semi-finished product
- 2 carrier layer
- 3 feed direction of the carrier layer
- 4 upper cover layer
- 5 lower cover layer
- 6 upper segment part
- 7 web
- 8 lower segment part
- 9 platelet-shaped segment
- 9a segment strips
- 10 undercut
- 11 aperture
- 12 connection areas
- 13 flat structure
- 14 moulded part
- 15 Brush roller with direction of rotation related to feed direction

The invention claimed is:

1. A multilayered, flexible, flat semi-finished product with a segment-like surface, the semi-finished product being constructed in a layered manner, consisting of a carrier layer and an upper cover layer and a lower cover layer, and comprising at least two materials, wherein
    the first material is a flat structure,
    the second material has a lower drapability than the first material,
    the carrier layer is formed by the first material, which is coated with the second material on an upper side as the upper cover layer and on an underside as the lower cover layer, characterized in that
    the second material forms the upper cover layer from a multitude of upper segment parts and each upper segment part is connected by a web to a lower segment part penetrating the carrier layer, and that each upper segment part and each lower segment part form one of a plurality of platelet-shaped segments,
    the platelet-shaped segments have undercuts in an area of the web,
    the carrier layer has slot-like apertures which correspond to a contour of the undercuts, and
    the undercuts of the platelet-shaped segments are positively connected to the apertures in the carrier layer and the upper segment parts rest on the upper side of the carrier layer and the lower segment parts rest on the underside of the carrier layer.

2. The semi-finished product according to claim 1, wherein the first material is a flat structure of plastics or fibre composite material.

3. The semi-finished product according to claim 1, wherein the second material is wood, metal, plastics or a fibre composite material, the fibre composite material being based on a textile flat structure.

4. The semi-finished product according to claim 3, wherein the textile flat structure consists of natural fibres or glass, carbon, basalt or thermoplastic plastic filaments or fibres and/or mixtures thereof.

5. The semi-finished product according to claim 1, wherein the geometric shape of at least one of the platelet-shaped segments corresponds, in a plan view, to a circular sector or a portion of a polygon or a mixture of these geometric figures.

6. The semi-finished product according to claim 1, wherein the plurality of platelet-shaped segments is connected by connection areas in a first direction.

7. The semi-finished product according to claim 6, wherein the connection areas are of a strip-shaped or polygonal design.

8. The semi-finished product according to claim 6, wherein a plurality of strip-shaped segments are arranged next to one another in the first direction and offset on the carrier layer in the first direction and/or a second direction.

9. The semi-finished product according to claim 1, wherein the upper and lower segment parts are partially or completely coated with an adhesive on a side facing the carrier layer, the carrier layer and the segments being positively connected to one another.

10. The semi-finished product according to claim 1, wherein the platelet-shaped segments have flat contact with the carrier layer and/or with one another.

11. A coated semi-finished product comprising the semi-finished product according to claim 1, wherein the semi-finished product is coated with a third material.

12. The coated semi-finished product according to claim 11, wherein the third material is a flat structure of natural fibres or glass, carbon, basalt or thermoplastic plastic filaments or fibres or mixtures thereof.

13. A method for manufacturing the semi-finished product according to claim 1 or a coated semi-finished product comprising the semi-finished product according to claim 1, comprising the following steps:
    providing the first material as a flat structure for the carrier layer,
    providing the second material for the upper and lower cover layers,
    producing the apertures in the carrier layer corresponding to the contour of the undercuts of the platelet-shaped segments, separating at least one of the platelet-shaped segments out of the second material, wherein the at least one of the platelet-shaped segments has an upper segment part and a lower segment part, the upper and lower segment parts being connected to one another by a web and having undercuts between the upper and lower segment parts, positive connecting of the platelet-shaped segments to the carrier layer by means of penetration of the platelet-shaped segments through the apertures of the carrier layer, and arranging of the upper segment parts in a flat manner on one another and/or on the carrier layer and arranging of the lower segment parts in a flat manner on one another and/or on the carrier layer.

14. The method according to claim 13, wherein the platelet-shaped segments are produced by means of laser beam cutting, water beam cutting or cutting with a geometrically determined cutting edge.

15. The method according to claim 13, wherein the apertures in the carrier layer are produced by means of laser beam cutting, water beam cutting or cutting with a geometrically determined cutting edge.

16. The method according to claim 13, wherein a third layer of a third material is provided.

17. The method according to claim 16, wherein the third layer of the third material is connected to the carrier layer by means of adhesive or thermal activation.

18. The method according to claim 16, wherein the third layer of the third material is connected to the lower cover layer.

19. A multidimensionally curved moulded part, manufactured from a semi-finished product according to claim 1, wherein the upper segment parts of the upper cover layer are connected to the carrier layer and to the lower segment parts of the lower cover layer in a positive and integral manner.

20. The multidimensionally curved moulded part according to claim 19, wherein the moulded part is coated with a transparent material.

21. The multidimensionally curved moulded part according to claim 20, wherein the transparent material is a lacquer system or a foil.

22. The multidimensionally curved moulded part according to claim 19, wherein a layer of a third material is connected to the lower cover layer.

23. A method for manufacturing a multidimensionally curved moulded part according to claim 19 comprising the following steps:

providing the semi-finished product according to claim 1,
cutting of the semi-finished product,
heating the semi-finished product to a melting temperature of thermoplastic materials used; and
multidimensional moulding of the semi-finished product.

24. The method according to claim 23, wherein a temperature is adjusted during the heating in such a way that material properties of the upper and lower cover layers are not changed.

25. The method according to claim 23, wherein the semi-finished product is heated on one or both sides.

26. The method according to claim 23, wherein the semi-finished product is compacted during moulding.

27. The method according to claim 26, wherein the compaction of the semi-finished product differs locally.

* * * * *